United States Patent [19]

Fiedler et al.

[11] 4,042,259
[45] Aug. 16, 1977

[54] SUSPENSION STRUT ASSEMBLIES FOR MOTOR VEHICLE SUSPENSIONS

[75] Inventors: Kurt H. Fiedler, Geinsheim; Adolf Draisbach, Kelsterbach, both of Germany

[73] Assignee: General Motors Corporation, Detroit, Mich.

[21] Appl. No.: 596,715

[22] Filed: July 17, 1975

[30] Foreign Application Priority Data

July 25, 1974  Germany ............................ 2435723

[51] Int. Cl.² .......................................... B60G 11/50
[52] U.S. Cl. ..................................... 280/701; 29/227; 29/239; 267/20 A; 280/668
[58] Field of Search ............... 280/662, 663, 666, 667, 280/668, 670, 673, 690, 691, 692, 697, 701, 725; 267/20 A, 34; 29/426, 239, 227

[56] References Cited

U.S. PATENT DOCUMENTS

| 2,334,597 | 11/1943 | Badertscher | 267/20 A |
| 3,346,272 | 10/1967 | Smith | 280/668 |
| 3,584,856 | 6/1971 | Desbois | 267/34 |

Primary Examiner—John P. Silverstrim
Attorney, Agent, or Firm—John P. Moran

[57] ABSTRACT

A suspension strut assembly for a motor vehicle suspension including a telescopic damper which is connected at its ends to a wheel carrier and to part of the vehicle superstructure, and a wheel suspension spring which surrounds the damper and is seated at one end on a casing portion of the damper and at the other end effectively on a piston rod of the damper.

To facilitate replacement of worn parts without the need to dismount the entire strut, the connection of the damper to the vehicle superstructure is effected by means of an intermediate member having a bayonet-type or other form of releasable connection to an appropriately shaped aperture in the superstructure such that on release the intermediate member can be lifted out through the aperture, as can the inner part of a two-part thrust plate for the suspension spring, and a ring nut giving access to the internal parts of the damper.

7 Claims, 4 Drawing Figures

SUSPENSION STRUT ASSEMBLIES FOR MOTOR VEHICLE SUSPENSIONS

This invention relates to suspension strut assemblies for wheel suspensions of motor vehicles.

Such suspension strut assemblies basically consist of a telescopic damper having a damper tube within which a damper piston with a piston rod is arranged to be axially movable, and a wheel spring which surrounds the damper tube and at one end is seated on a part providing reaction at the vehicle wheel, and at the other end, together with an upper end portion of the piston rod, is seated on a body portion of the vehicle.

In wheel suspensions of the above kind, it may become necessary from time to time to replace defective or worn parts, for example internal parts of the telescopic damper, and a difficulty is that this may well involve first releasing the suspension strut itself or components attached thereto, such as guide arms, drive shafts or track rods. Such replacement will also involve freeing the particular vehicle wheel from load, notably the load imposed by the wheel spring.

The present invention is concerned with a construction of a suspension strut assembly which allows easy exchange of components of the suspension strut, without the need for releasing the entire strut or component parts or the strut, and without the need for taking the load off the wheel.

By the present invention there is provided a suspension strut assembly for a motor vehicle suspension, comprising a telescopic damper which is adapted to form a mounting for a vehicle wheel and has a damper tube within which a damper piston provided with a piston rod is arranged to be axially movable, a wheel spring which surrounds the damper tube and at one end is seated on a part providing reaction at the vehicle wheel, and at the other end, together with an upper end portion of the piston rod, is seated on a body portion of the vehicle, a common releasable intermediate member by means of which the piston rod and the wheel spring are supported relative to the body portion of the vehicle, and, provided in the body portion of the vehicle at the point of support for the piston rod and the wheel spring, an aperture having an area such that, after release of the intermediate member, at least those parts of the suspension strut which are liable to wear can be dismantled therethrough.

The aperture in the body portion of the vehicle may be of substantially circular cross-section, and be arranged coaxially of the suspension strut. The intermediate member may likewise be of substantially circular cross-section, but of a smaller diameter than the aperture and, by means of radially outwardly directed lug-shaped extensions, it may be releasably secured to the body portion of the vehicle at the edge region of the aperture by screws.

The intermediate member may be releasably secured to the edge region of the aperture, preferably at diametrically opposite points.

A suspension strut assembly constructed in accordance with the invention offers the advantage that such parts of the suspension strut as are liable to wear (in particular, parts of the telescopic damper) can be withdrawn in an upward direction and re-assembled again in a simple manner, by passing them through the aforesaid aperture in the body portion of the vehicle. This involves simply releasing (and subsequently re-engaging) the intermediate member of the suspension strut assembly.

The aperture in the body portion of the vehicle may have outwardly directed lug-like widenings (that is, local enlargements of the aperture) which correspond approximately in shape and angular arrangement to the lug-shaped extensions of the intermediate member but have dimensions exceeding those of the lug-shaped extensions. By providing a lug-like widening on the body portion of the vehicle to correspond to each lug-shaped extension of the intermediate member, and staggering the widenings circumferentially by a certain angle with respect to the respective extensions, with reference to the attachment points of the intermediate member, it is possible to achieve easy withdrawal of the intermediate member after loosening of the attachment means, simply by turning the intermediate member until the lug-shaped extensions coincide with the respective lug-like widenings.

In principle there could be various numbers of lug-shaped extensions in the intermediate member, with a corresponding number of widenings in the aperture in the body portion of the vehicle, with the respective angular spacings corresponding exactly with each other. An embodiment of the invention which is preferred on the grounds of simple and inexpensive production is one in which the intermediate member has a pair of diametrically opposite lug-shaped extensions and the aperture in the body portion of the vehicle correspondingly has a pair of diametrically opposite lug-like widenings, and the widenings are staggered circumferentially by an angle of 90° with respect to the respective extensions.

A releasable attachment of the intermediate member to the telescopic damper may be achieved by arranging that, approximately in its central region, the intermediate member is releasably connected to the upper end of the piston rod of the telescopic damper. Since the intermediate member must be capable of transmitting the entire wheel load to the vehicle body, it must possess great strength and at the same time exhibit a high degree of elasticity. A preferred construction for the intermediate member consists of an outer sheet-metal stamping and an inner solid shaped piece, the two parts being connected together by an annular elastomeric member, preferably of rubber.

For transmission of the force of the wheel spring to the intermediate member, and therefore to the vehicle superstructure, the wheel spring may be seated at its upper end on the intermediate member by way of a thrust plate which corresponds approximately to the diameter of the spring. This embodiment is particularly suitable for use with a wheel spring constructed as a helical spring, as is generally the case with suspension struts. The thrust plate conveniently consists of two parts that are releasably interconnected, namely an annular outer part on which the wheel spring is seated, and a disc-shaped central part which has a diameter less than that of the aperture in the vehicle body. The advantage of this construction is that the aperture in the vehicle body need only be large enough to allow the central disc-shaped part of the thrust plate to pass through.

If the suspension strut is to be used in conjunction with a steered wheel of the vehicle it is advantageous, in view of the rotary movement of the damper tube with respect to the damper piston rod, to arrange a ball-type thrust bearing between the thrust plate and the solid shaped piece of the intermediate member, the thrust bearing surrounding the damper piston rod. Further, it is advisable to limit resilient bump movement (in-springing) and provide additional cushioning by arranging a rubber buffer at the underside of the thrust plate and surrounding the damper piston rod.

The damper tube may be concentrically surrounded by a protective tube which is secured by its bottom end portion to a stub axle for the vehicle wheel, and be releasably secured at its upper end to the damper tube by means of a ring nut, with the outer diameter of the ring nut smaller than the inner diameter of the annular outer part of the thrust plate.

The aperture provided for the upward removal of the parts of the damper may be formed directly in an integral sheet metal portion forming part of the vehicle body, specifically the wheel arch, but for reasons of simpler production and assembly it will generally be preferable for the intermediate member to be secured to an upper apertured end face of a dome-like turret portion which is formed as a separate part and is inserted from below into an opening in the respective wheel arch and is then firmly secured to this latter, preferably by welding.

To allow the resilient intermediate member to be relieved of load during the dismantling of parts susceptible to wear, after release of the attachment means of the intermediate member the force of the wheel spring may be overcome by the use of one or more hold-down tools introduced through access apertures provided in the turret portion for this purpose, by engagement of the tool against an upper surface portion of the thrust plate and against an under surface portion of the turret portion.

The appended claims define the scope of the invention claimed. The invention and how it can be performed are hereinafter particularly described with reference to the accompanying drawings, in which:

Figure 1:
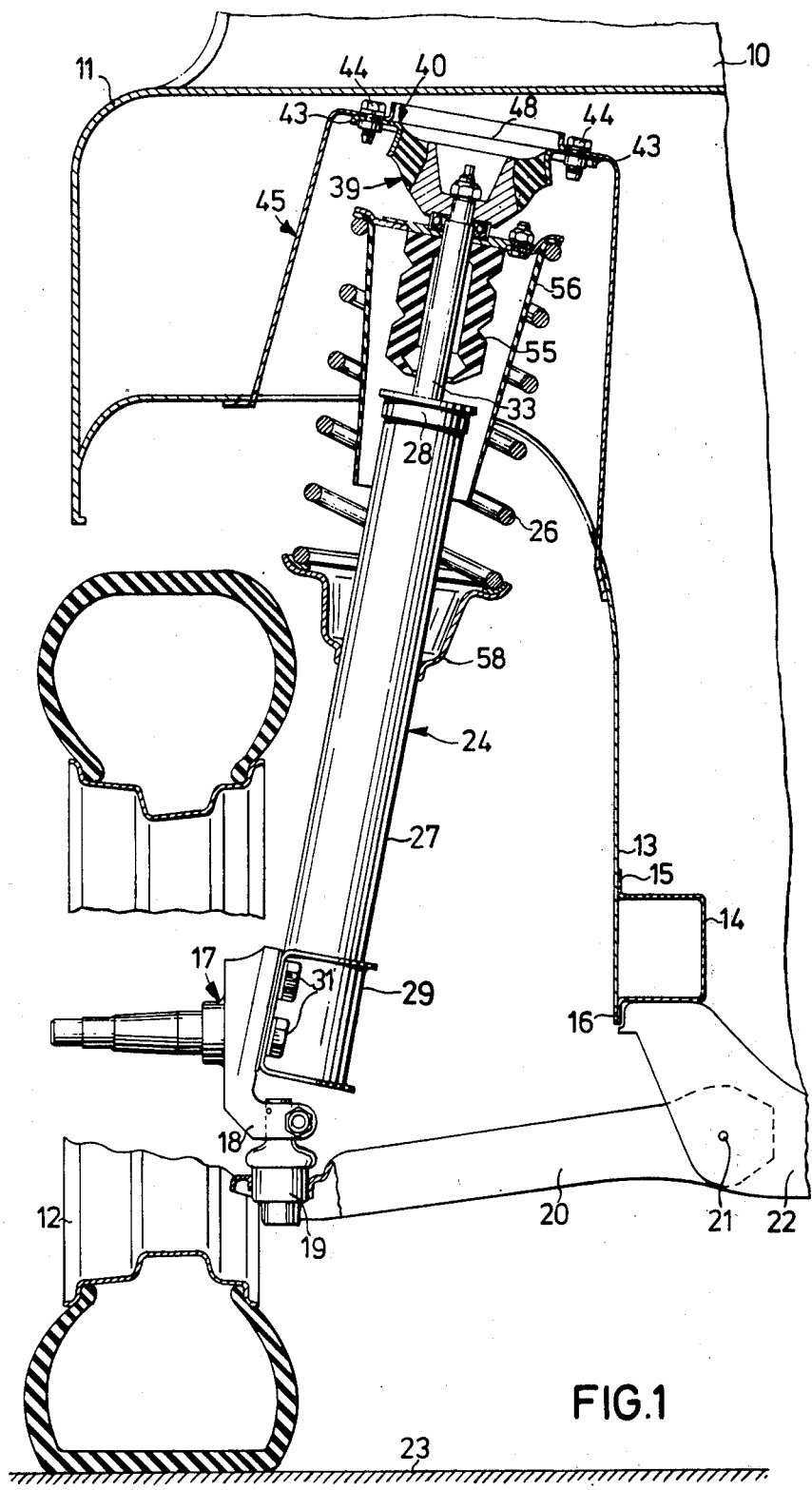
FIG. 1 is a fragmentary transverse section of one half of the front part of a passenger vehicle, and gives an overall view of a preferred embodiment of a suspension strut assembly in accordance with the present invention.

In FIG. 1 of the drawings, reference numeral 10 designates a cowl portion and 11 a front body portion forming part of the superstructure of a passenger vehicle. The front body portion 11 includes a wheel arch 13 for a front wheel 12 of the vehicle. FIG. 1 also shows a front frame portion 14 to which (at 15 and 16) the sheet metal of the wheel arch 13 is welded.

The front wheel 12 is mounted on a stub axle 17. This stub axle 17 is provided with a cantilever guide arm 18, to which the ball-headed pin (not shown) of a universal joint 19 is connected. The casing of this universal joint 19 is accommodated in an eye portion of a transverse link 20. This transverse link 20 is constructed as a triangular guide arm and is pivotally mounted at 21 in a frame cross-member 22 connected to the front frame portion 14.

In order to cushion and damp the impacts exerted by a road surface 23 on the front wheel 12 of the vehicle, use is made of a suspension strut having the general designation 24. In the main, this suspension strut 24 consists of a telescopic damper 25 and a wheel spring 26 formed as a helical compression spring. The telescopic damper 25 includes a damper tube 32 (FIG. 2) which is concentrically surrounded and protected by a casing tube 27 and is connected at its upper end to this latter by means of a ring nut 28.

The suspension strut 24 is connected to the stub axle 17 by means of a clamp 29 of U-shaped cross-section which is disposed round the casing tube 27 and welded to it. The clamp 29 is open in the direction towards the stub axle 17 and terminates in two outwardly extending flanges by means of which the clamp 29, and therefore the entire telescopic damper 25, is connected to the stub axle 17 by means of four screws 31 (FIG. 1).

Figure 2:
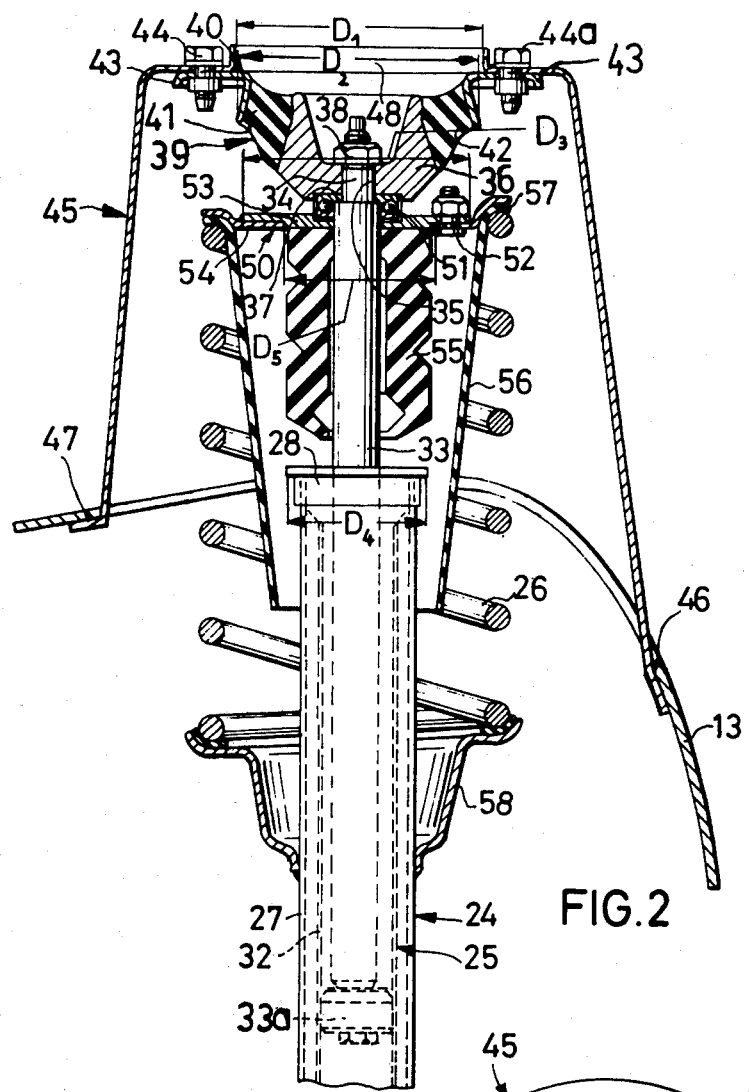
FIG. 2 is a fragmentary section showing part of the strut assembly of FIG. 1 to a larger scale, and is a section on the line II—II of FIG. 3, in the direction of the arrows.

As FIG. 2 in particular shows, a damper piston rod 33 provided with a damper piston 33a is displaceably and rotatably arranged within the damper tube 32 of the telescopic damper 25. The upper end portion of the damper piston rod 33 has a pin-like extension 34 which passes through an aperture 35 in a solid member 36 and is axially secured to this member by means of a shoulder 37 and a securing nut 38. The solid member 36 forms part of an intermediate member, generally designated 39, by means of which the entire suspension strut 24 is supported in the upward direction against the front body portion 11 of the vehicle superstructure. In detail, the intermediate member 39 consists of an outer sheet-metal stamping 40 with an inner, downwardly bent frustoconical edge 41, and the aforementioned solid member 36 below. These tow parts 40 and 36 of the intermediate member 39 are interconnected by an annular rubber element 42, which is bonded to the adjoining parts 41 and 36 by vulcanising. The inner solid member 36 in this embodiment is a light metal casting.

As will be further apparent from FIGS. 1 and 2, the outer sheet-metal stamping 40 of the intermediate member 39 has an inner edge 41 bent downwardly and slightly conically outwardly, and the solid member 36 is somewhat pot-shaped and has a correspondingly frustoconical outer wall. The interconnection of the sheet-metal stamping 40 and the solid member 36 is achieved by engagement of the elastomeric element on the one hand with the frustoconical edge 41 of the sheet-metal stamping, and on the other hand with the frustoconical outer wall of the solid member 36, in such a way that the latter is arranged somewhat lower than the attachment plane of the outer sheet-metal stamping 40. In this manner the wheel loads, which are considerable, are absorbed in a very safisfactory manner by the annular elastomeric element 42 disposed between the solid member 36 and the outer sheet-metal stamping 40.

Figure 3:
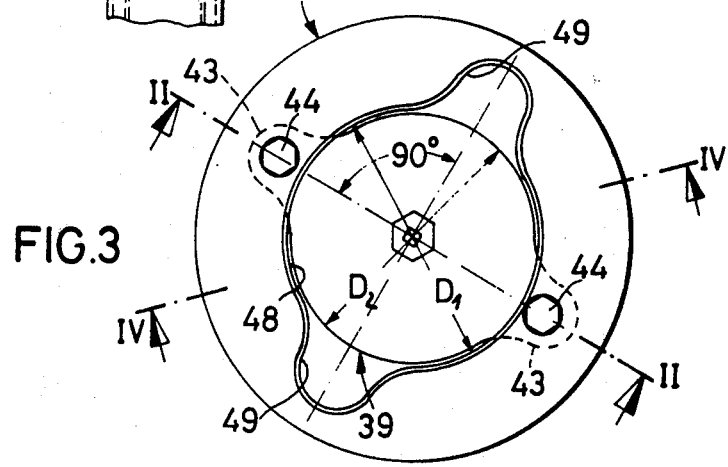
FIG. 3 is a plan view of what is shown in FIG. 2.

The entire resilient intermediate member 39, which has the task of transmitting the whole of the wheel load to the vehicle superstructure 11, is provided — as is illustrated in FIG. 3 — with two diametrically opposite lug-shaped extensions 43, by way of which it is secured by screws 44, 44a to a part 45 of the front body portion 11 of the vehicle. This part 45 takes the form of a dome-like turret portion which is inserted from below into an opening in the wheel arch 13, and is fixedly connected to the latter at 46 and 47 by spot welding. As will be apparent from FIGS. 2 and 3, the dome-like turret portion 45 is provided at its upper end face with a circular aperture 48 whose diameter D1 is greater than the diameter D2 of the resilient intermediate member 39. FIG. 3 further shows that the aperture 48 in the dome-like turret portion 45 is provided with two lug-like widenings (local enlargements) 49 which are arranged at two diametrically opposed points of the aperture 48. These lug-like widenings 49 are of approximately the same shape as the lug-shaped extensions 43 of the resilient intermediate member 39, but they are of larger dimensions. Moreover, as FIG. 3 shows, the widenings 49 are staggered circumferentially by an angle of 90° with respect to the extensions 43. Therefore, after the screws 38 and 44, 44a have been unscrewed, the intermediate member 39 may be turned through 90° until the lug-shaped extensions 43 coincide with the widenings 49 in the aperture 48, whereupon the intermediate member 39 can be withdrawn in an upward direction out through the aperture 48.

FIG. 2 further shows how the forces from the wheel spring 26 are transmitted to the intermediate member 39, and therefore to the vehicle superstructure 45, 11. Such force transmission is effected by way of a thrust plate 50 which bears against the solid member 36 of the intermediate member 39 through the intermediary of a ball-type thrust bearing 51. However, this thrust bearing 51 is needed only when a steered wheel of the vehicle is involved. The steering movement of the steered front wheel 12, shown in FIG. 1, takes place in this case about the axis formed by the connecting line between the universal joint 19 and the upper resilient support constituted by the intermediate member 39, whilst the actual turning movement takes place in the thrust bearing 51.

Secured to the underside of the thrust plate 50, which consists of two parts 53 and 54 interconnected by screws 52, there is a rubber buffer 55 which ensures resilient limitation of the bump movement (in-springing action) and provides additional cushioning. Further, part of the damper's piston rod 33 projecting out of the damper tube 32 is enclosed by a frustoconical casing 56 of rubber or soft plastics material. This frustoconical casing 56 is clamped, by a reinforced upper flange 57 thereof, between the upper end of the wheel spring 56 and the thrust plate 50. Its function is to protect the piston rod 33 of the damper and also to isolate the wheel spring 26 from the superstructure. The lower end of the wheel spring 26 is seated against a flange-like fitting 58 welded to the protective tube 27, and thus reacts against the front wheel 12 of the vehicle.

Figure 4:
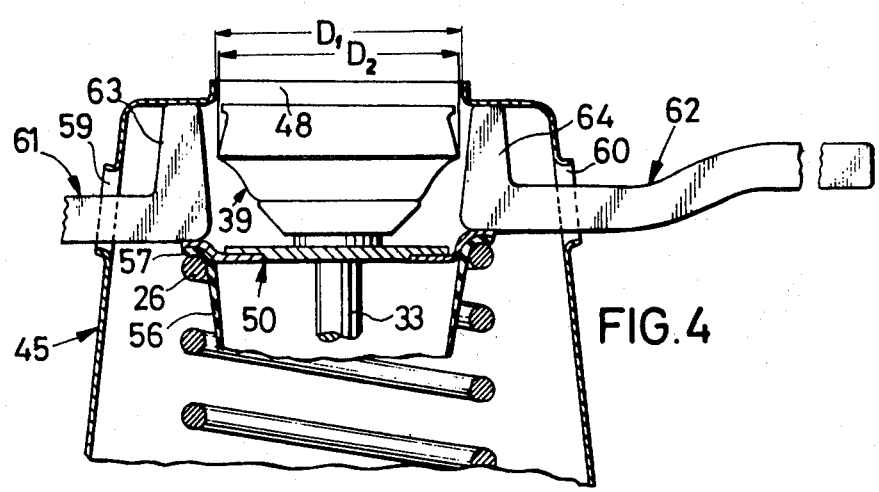
FIG. 4 is a fragmentary section on the line IV—IV of FIG. 3, in the direction of the arrows.

As FIG. 4 shows, the dome-like turret portion 45 is provided with two diametrically opposed lateral access apertures 59 and 60, for the introduction of two hold-down tools 61 and 62 respectively. These tools have angled lug portions 63 and 64 respectively for engagement against an under surface portion of the dome-like turret portion 45 and an upper surface portion of the thrust plate 50. When the parts of the suspension strut 24 are being dismantled, the use of the hold-down tools serves to overcome the force of the wheel spring 26 and thereby relieve the resilient intermediate member of load.

The removal of, for example, worn parts of the suspension strut may thereby be carried out as follows. The hold-down tools 61 and 62 are introduced through the lateral access apertures 59 and 60 in the dome-like turret portion 45, and their lug portions 63 and 64 are forcibly engaged between the turret portion 45 and the thrust plate 50, such that the resilient intermediate member 39 is in effect bridged over and is relieved of load. It is then possible to loosen the screws 44 and 38 which secure the resilient intermediate member to the vehicle superstructure 45, 11 on the one hand, and to the suspension strut 24 on the other hand. The resilient intermediate member 39 can then be turned through an angle of 90° until the lug-shaped extensions 43 register with the lug-like widenings 49 of the dome-like turret portion 45, so allowing the resilient intermediate member 39 to be withdrawn. After the screws and nuts 52 have been unfastened, the inner part 53 of the thrust plate 50 (of outer diameter D3) can be lifted out through the aperture 48 (of diameter D1), so making the ring nut 28 accessible. The ring nut 28 is then unscrewed from the protective tube 27, whereupon the damper tube 32 together with the piston rod 33 and the damper piston 33a can be withdrawn upwardly through the circular aperture 48 in the turret portion.

We claim:

1. A suspension assembly for a vehicle having a body with an aperture therein, said assembly comprising: a telescopic damper including a protective tube, a damper tube removably mounted within said protective tube, and a piston rod telescopically received in said damper tube; a wheel mounting means connected to said protective tube; an intermediate member connected to said piston rod, said member being releasably mounted to said body at the periphery of said aperture; a spring surrounding said protective tube; a lower spring seat mounted on said protective tube; and an upper spring thrust plate abutting said intermediate member; the relative size of said aperture and said intermediate member, being such that upon release of said intermediate member, at least said intermediate member, said piston rod and said damper tube can be removed upwardly through said aperture without removing said thrust plate, spring, seat and protective tube.

2. A suspension strut assembly for a motor vehicle suspension, comprising a telescopic damper having a tubular casing, a stub axle secured to the tubular casing to form a rotary mounting for a road wheel of the vehicle, a damper tube disposed within the tubular casing, a damper piston axially movable within the damper tube, a piston rod secured to the damper piston and projecting axially from the tubular casing, spring seat means secured to the tubular casing, a helical suspension spring surrounding the tubular casing and seated at one end on the spring seat means, a thrust plate surrounding the piston rod and comprising an annular outer part which has an external diameter substantially the same as that of the suspension spring and forms a seat for the other end of the suspension spring, a disc-shaped central part, and means releasably securing the annular outer part to the disc-shaped central part of the thrust plate, an intermediate member of generally circular cross-section releasably secured to an end portion of the piston rod and providing reaction for the thrust plate, and a vehicle body portion having formed therein an aperture of generally circular cross-section, disposed coaxially above the suspension strut and having a larger diameter than the intermediate member and a larger diameter than the disc-shaped central part of the thrust plate, and means releasably securing the intermediate member to the body portion of the vehicle at an edge region of the said aperture therein, whereby after release of the securing means for the intermediate member the intermediate member can be withdrawn upwardly through the aperture and thereupon after release of the securing means of the thrust plate the disc-shaped central part of the thrust plate can be withdrawn upwardly through the aperture.

3. In a motor vehicle suspension having a suspension strut assembly which comprises a telescopic damper with a tubular casing, lower spring seat means secured to the tubular casing, a piston rod for an axially movable damper piston projecting axially from the casing, an upper spring seat thrust plate surrounding the piston rod, a compression spring surrounding the tubular casing and piston rod and reacting with its ends on the said respective lower spring seat means and upper spring seat thrust plate, and a wheel carrier secured to the tubular casing for forming a rotary mounting for a road wheel of the vehicle, the improvement which comprises an intermediate member secured to the piston rod and abutting the upper spring seat thrust plate and having a generally circular cross-section with a plurality of radially outwardly directed lug-shaped extensions, an aperture formed in a body portion of the vehicle above the intermediate member and having a generally circular cross-section of larger diameter than the intermediate member with a plurality of lug-like widenings of the aperture which have a shape and angular arrangement corresponding approximately to the shape and angular arrangement of the lug-shaped extensions of the intermediate member but having dimensions exceeding those of the lug-shaped extensions, and releasable securing means securing the lug-shaped extensions, to an edge region of the aperture in the body portion with the lug-shaped extensions circumferentially staggered relative to the lug-like widenings, whereby after release of the securing means the intermediate member can be turned into a position permitting withdrawal of the intermediate member upwardly through the aperture.

4. In a motor vehicle suspension having a suspension strut assembly which comprises a telescopic damper with a tubular casing, lower spring seat means secured to the tubular casing, a piston rod for an axially movable damper piston projecting axially from the casing, an upper spring seat thrust plate surrounding the piston rod, a compression spring surrounding the tubular casing and piston rod and reacting with its ends on the said respective lower spring seat means and upper spring seat thrust plate, and a wheel carrier secured to the tubular casing for forming a rotary mounting for a road wheel of the vehicle, the improvement which comprises an intermediate member secured to the piston rod and abutting the upper spring seat thrust plate and having a generally circular cross-section with a pair of diametrically opposed radially outwardly directed lug-shaped extensions, an aperture formed in a body portion of the vehicle above the intermediate member and having a generally circular cross-section of larger diameter than the intermediate member with a pair of lug-like widenings of the aperture which have a shape and angular arrangement corresponding approximately to the shape and angular arrangement of the lug-shaped extensions of the intermediate member but having dimensions exceeding those of the lug-shaped extensions, and releasable securing means securing the lug-shaped extensions to an edge region of the aperture in the body portion with the lug-shaped extensions circumferentially staggered relative to the lug-like widenings, whereby after release of the securing means the intermediate member can be turned into a position permitting withdrawal of the intermediate member upwardly through the aperture.

5. A suspension strut assembly for a motor vehicle suspension, comprising a telescopic damper having a tubular casing, a stub axle secured to the tubular casing to form a rotary mounting for a road wheel of the vehicle, a damper tube disposed concentrically within the tubular casing, a damper piston axially movable within the damper tube, a piston rod secured to the damper piston and projecting axially from the tubular casing, a ring nut surrounding the piston rod and releasably securing an end portion of the tubular casing to an end portion of the damper tube, spring seat means secured to the tubular casing, a helical suspension spring surrounding the tubular casing and seated at one end on the spring seat means, a thrust plate surrounding the piston rod and comprising an annular outer part which has an external diameter substantially the same as that of the suspension spring and an internal diameter greater than the diameter of the ring nut and forms a seat for the other end of the suspension spring, a disc-shaped central part, and means releasably securing the annular outer part to the disc-shaped central part of the thrust plate, an intermediate member of generally circular cross-section releasably secured to an end portion of the piston rod and providing reaction for the thrust plate, and a vehicle body portion having formed therein an aperture of generally circular cross-section, disposed coaxially above the suspension strut and having a larger diameter than the intermediate member and a larger diameter than the disc-shaped central part of the thrust plate, and means releasably securing the intermediate member to the body portion of the vehicle at an edge region of the said aperture therein, whereby after release of the securing means for the intermediate member the intermediate member can be withdrawn upwardly through the aperture, after release of the securing means of the thrust plate the disc-shaped cental part of the thrust plate can be withdrawn upwardly through the aperture, and thereupon the ring nut can be withdrawn upwardly through the aperture, so giving access to the damper piston to permit upward withdrawal thereof.

6. A suspension strut assembly according to claim 5, in which the intermediate member of generally circular cross-section includes a pair of diametrically opposed radially outwardly directed lug-shaped extensions, the aperture of generally circular cross-section formed in the body portion of the vehicle has a pair of lug-like widenings which have a shape and angular arrangment corresponding substantially to the shape and angular arrangement of the lug-shaped extensions of the intermediate member but have dimensions exceeding those of the lug-shaped extensions, and, with the intermediate member positioned such that the lug-shaped extensions are staggered circumferentially by an angle of 90° relative to the lug-like widenings, securing screws constituting releasable securing means for the intermediate member as aforesaid releasably securing the lug-shaped extensions of the intermediate member to the vehicle body portion at the said edge region of the aperture therein.

7. A suspension strut assembly according to claim 6, in which the aperture at the edge region of which the intermediate member is releasably secured is formed in a dome-like turret portion that is fixedly secured to a wheel arch of the body portion of the vehicle, and the turret portion is provided with access apertures for the introduction of at least one hold-down tool adapted to overcome the force of the suspension spring by engagement of the tool against an upper surface portion of the thrust plate and against an under surface portion of the turret portion.

* * * * *